M. SCHICK.
ATTACHMENT FOR AUTOMOBILE AND OTHER WHEELS.
APPLICATION FILED AUG. 29, 1917.
1,332,273.
Patented Mar. 2, 1920.
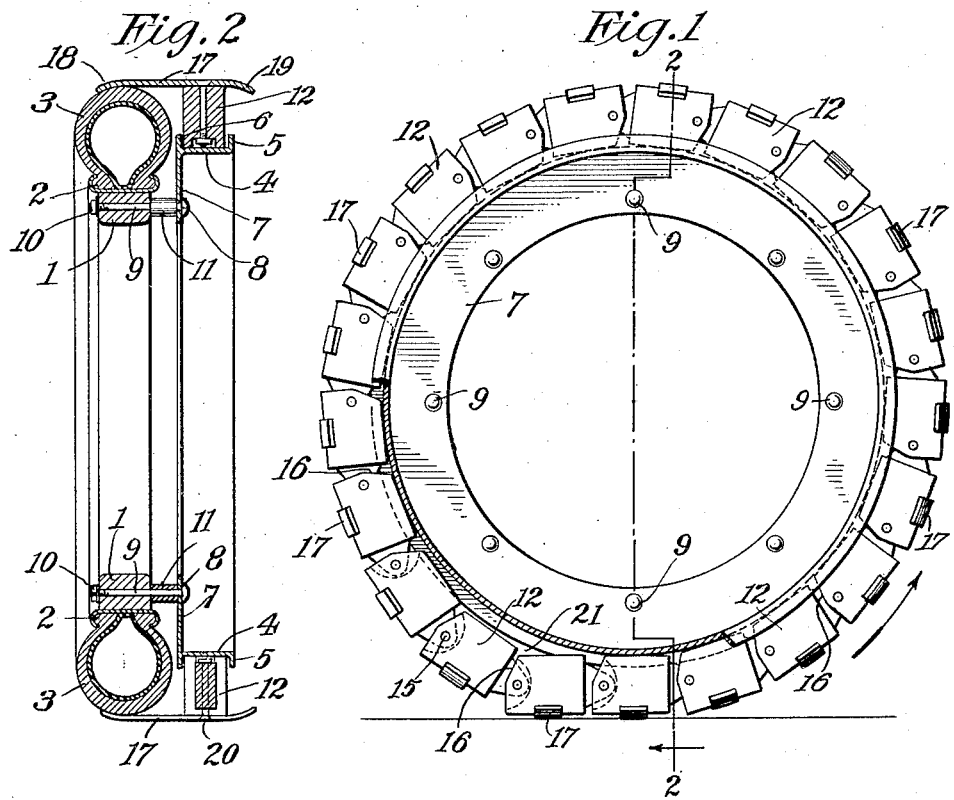
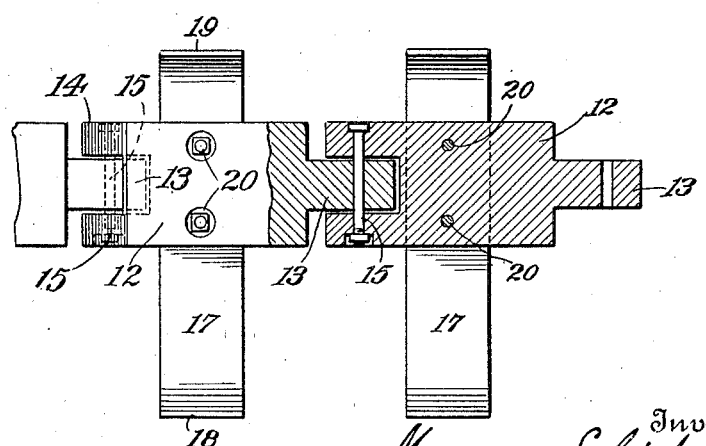
Inventor,
Murray Schick.
By his Attorney
Phillips Abbott.

UNITED STATES PATENT OFFICE.

MURRAY SCHICK, OF SALT LAKE CITY, UTAH.

ATTACHMENT FOR AUTOMOBILE AND OTHER WHEELS.

1,332,273.  Specification of Letters Patent.  Patented Mar. 2, 1920.

Application filed August 29, 1917. Serial No. 188,703.

*To all whom it may concern:*

Be it known that I, MURRAY SCHICK, a citizen of the United States, and a resident of Salt Lake City, county of Salt Lake, and State of Utah, have invented a new and useful Improvement in Attachments for Automobile and other Wheels, of which the following is a specification, reference being had to the accompanying drawings.

It is the purpose of this invention to provide means whereby the skidding of automobiles upon soft, slippery or wet roads may be prevented and also the traction of the wheels upon the roadbed increased, so that the vehicle, if it encounters a soft section of the roadbed, or if compelled wholly or partly to leave the hard surface thereof and pass upon the softer lateral sections, may be able to successfully traverse them. Broadly stated, therefore, the invention consists in means easily attached and detached, whereby skidding will be prevented and when desired the surface contact between the roadbed and the wheels increased, thus improving the traction and enlarging the supporting surfaces.

In the drawings hereof I illustrate a single automobile wheel only and show it diagrammatically merely as consisting of rim, felly and tire.

Figure 1 is a sidewise elevation of a wheel having my invention applied thereto; Fig. 2 is a vertical sectional view on the line 2—2 of Fig. 1; Fig. 3 is a plan view, partly is section, showing one form in which my endless track attachment may be made.

Referring first to Figs. 1 to 3 of the drawings, 1 represents the felly of the wheel, 2 the metallic rim thereof, 3 the tire. These parts are or may be of any preferred construction. 4 is a ledge-like ring having upon its outer edge a radially extending flange 5 and upon its inner edge a similarly radially extending flange 6. 7 is an inwardly extending flange provided with a series of bolt holes 8, through which bolts 9 pass which likewise pass through similar holes made in the felly 1 of the wheel, having nuts and washers 10, preferably on the inside of the wheel. 11 are spacing collars, whereby the ring 4 may be properly offset from the side of the wheel, so as to allow necessary space for the expansion of the shoe when under compression and yet permit the bolts 10 to be screwed up tight, so as to give good firm holding support for the ledge 4.

12, 12, is a series of blocks made as shown best in Fig. 3, that is to say, at one end each of these blocks has one or more projecting tongues or tenons 13, and at the opposite end a corresponding mortise or mortises 14, (one tenon and one mortise only are shown in the drawings) so that pins 15, see Fig. 3, being passed through the tenons and mortises the blocks will be pivotally connected together into a continuous unbroken ring or chain. In order that the blocks may flex relative to each other without interference, I prefer to chamfer off one corner of each block as shown at 16. 17, 17, are a series of rigid traction shoes, as I call them. They are preferably made of metal, either forged or cast and may be flat as shown in the drawings, or have projections of any desired form on their outer surfaces. I show them flat upon their outer surface since ordinarily that shape has been found best, because if projecting surfaces, such as ribs, calks, or other projections, are made upon their outer faces, injury to asphalt, Tarvia, or macadamized roads is apt to result, especially if the car be carrying a heavy load. I prefer to provide one of these traction shoes for each of the blocks 12, and this being my preferred construction is the form of my invention here illustrated.

It will be noted as shown clearly in Fig. 2, that in the special construction illustrated, the shoe is attached to the blocks 12 eccentrically and that the longer end 18 rests upon and is supported by the wheel tire 3. I prefer to bend inwardly the extreme end of the shoe at this point, so as to make its engagement with and support by the shoe somewhat more secure. Similarly I bend inwardly the opposite or shorter end 19 of the shoe, so that it will be less liable to injury due to its engagement with the roadbed. These shoes as shown in Fig. 3, are attached to the blocks 12 by bolts 20.

It will be noted upon reference to Fig. 1, that the chain of blocks 12 does not snugly fit the ledge 4 which supports it, on the contrary, as shown at 21 in Fig. 1, there is considerable slack in the chain of blocks occasioned by the fact that the diameter of the chain defined by the inner surface of the blocks 12 is greater than the diameter of the exterior surface of the ledge 4, and so much slack is provided, that the blocks may be readily lifted off from or applied to the ledge 4 by lifting them and passing them over the flange 5, upon the outer edge of the ledge, and then running the car forward or backward a sufficient distance to free the wheels from the chain of blocks, or one of the pivotal pins 15 being removed, the chain of blocks may be straightened out and then applied to the ledge either by jacking up the wheel, if necessary, or by laying the straightened out chain on the roadbed in front of the wheel and then running it over the same a sufficient distance, and finally replacing the pivot pin 15. It will be noted that the flat surface upon the inner side of each block rests squarely upon the ledge 4 and that the thickness or width of the blocks is such that they nearly but not quite fill the space between the radially projecting flanges 5, 6, of the ledge, and thus good and reliable support for them is secured against displacement.

The operation is as follows: When the condition of the roadbed is suitable or in the event that the car carries no load, then the attachment will not ordinarily be needed. The rings of blocks will then be removed from the ledges and stowed away under the seat of the driver or in some other suitable place. If the roadbed be slippery, or if a soft section of roadbed be encountered, or a storm should arise, so that there is likelihood that means to prevent skidding or to increase the traction, or to afford greater supporting surface will be desired, then my rings or chains of blocks may be readily applied to the ledges of the driving wheels, and if need be upon all the wheels, the shoes 17 properly engaging with the tire 3 of the wheel. With the vehicle in this condition, it proceeds upon its journey and should a soft spot in the roadbed be encountered, or if it be necessary to turn off from the hard road upon the relatively soft surface by the side thereof, then it will be found that the shoes 17 plus the increased supporting surface afforded by the sets of blocks 12 will greatly increase the traction of the driving wheels and likewise afford materially greater support for the load, particularly since, as shown in Fig. 1, at least two and if desired three or four of the blocks may simultaneously have contact with the roadbed. The extent to which the blocks will engage with the roadbed, in other words, the number in such engagement, will of course depend upon the degree of slack that is present in the chain of blocks which may be materially greater than illustrated by me in Fig. 1, if desired. The chain of blocks will always retain its position upon the ledge because of the confining and supporting flanges 5, 6. If desired the ledge 4 may be so located as to be nearer the center of the wheel, in which event the blocks 12 should be correspondingly deeper, in order that the shoes 17 may be substantially level with the periphery of the wheel tire 3. The construction may, however, be such that the shoes 17 will be somewhat nearer the center of the wheel than the upper arc of the tires because the compression of the tires 3 will, when the weight is applied, bring the shoes that are beneath the lower arc of the wheel into proper position to exert their maximum supporting and tractive action.

It will be obvious to those who are familiar with such matters that the form of my invention above described and illustrated in Figs. 1, 2 and 3 is one form only in which it may be embodied. As illustrative of this I show in Fig. 4 a modified construction; indeed, various other modifications in the details of construction may be employed and still my invention be present. I therefore do not limit myself to the details shown and described.

I claim:

1. An attachment for a wheel provided with a suitable tire comprising an annular ledge adapted to be fastened to the side of the wheel, a radially extending flange upon the outer edge of the ledge, a series of blocks flexibly connected together, the length of the series exceeding the peripheral circumference of the ledge, whereby the series when applied to the ledge will be supported loosely thereby.

2. An attachment for a wheel provided with a suitable tire comprising an annular ledge adapted to be fastened to the side of the wheel, a series of blocks flexibly connected together, the length of the series exceeding the circumference of the ledge and adapted to be loosely supported thereon, and transversely arranged shoes fastened to the blocks which, when in position upon the wheel, are supported partly by the blocks and partly by the tire of the wheel.

3. An attachment for a wheel provided with a suitable tire comprising an annular ledge adapted to be fastened to the side of the wheel, a radially projecting flange upon the outside of the ledge, a series of blocks flexibly connected together, the length of the series being greater than the peripheral circumference of the ledge, so that when the series of blocks is in position upon the ledge a plurality of them will lie flat upon the roadbed, and transversely arranged shoes fastened upon the blocks.

4. An attachment for a wheel provided with a suitable tire comprising an annular ledge adapted to be fastened to the side of the wheel, radially projecting flanges upon the ledge, a series of blocks flexibly connected together, the length whereof is so much greater than the circumference of the ledge that it may be loosely deposited upon the ledge in such manner that a plurality of blocks will lie flat upon the roadbed, and transversely arranged shoes eccentrically fastened to the blocks, so that when in use they are supported partly by the blocks and partly by the tire of the wheel.

In testimony whereof I have signed my name to this specification.

MURRAY SCHICK.